US006926433B2

(12) United States Patent
Burke

(10) Patent No.: US 6,926,433 B2
(45) Date of Patent: Aug. 9, 2005

(54) PUSH-IN LIGHT SHIELD

(75) Inventor: Kevin G. Burke, Seymour, IN (US)

(73) Assignee: Valeo Sylvania L.L.C., Seymour, IN (US)

( * ) Notice: Subject to any disclaimer, the term of this patent is extended or adjusted under 35 U.S.C. 154(b) by 0 days.

(21) Appl. No.: 10/431,087

(22) Filed: May 7, 2003

(65) Prior Publication Data

US 2004/0165400 A1 Aug. 26, 2004

Related U.S. Application Data

(60) Provisional application No. 60/449,983, filed on Feb. 26, 2003, and provisional application No. 60/449,982, filed on Feb. 26, 2003.

(51) Int. Cl.$^{7}$ .................................................. B60Q 1/00

(52) U.S. Cl. ....................... 362/546; 362/288; 362/365; 362/368; 362/127

(58) Field of Search ................................. 362/365, 127, 362/546, 487, 507, 549, 476, 523, 288, 368; 312/9.57, 9.63, 107.5, 111, 222, 140; 4/465; 248/313, 224.8; 359/871, 872; 220/23.89

(56) References Cited

U.S. PATENT DOCUMENTS 5,297,767 A * 3/1994 Miller et al. ............. 248/311.2
6,502,975 B1 * 1/2003 Branstetter .................. 362/549

* cited by examiner

*Primary Examiner*—Sandra O'Shea
*Assistant Examiner*—Bertrand Zeade
(74) *Attorney, Agent, or Firm*—William E. Meyer

(57) ABSTRACT

An automotive headlamp shield may be formed with a self-locating mount. The housing contains a mounting receptacle with three closed sides, an open side, a substantially solid bottom with a laterally extending slot and a top containing an opening. One sub-assembly has a planar surface with an aperture, a solid rear wall and a depending side wall. When assembled, the depending sidewall fits into the slot and protrudes therefrom. Another sub-assembly has an upper surface and four walls including a front wall, a back wall and two sides. A compressible planar latch is associated with the upper surface and a first spring is associated with a side and a second spring is associated with the back. The second sub-assembly is hollow and the springs and the compressible latch are formed from the upper surface and respective sides. The structure is light weight and easy to manipulate.

5 Claims, 4 Drawing Sheets

PUSH-IN LIGHT SHIELD

This application claims priority from Provisional applications Nos. 60/449,983 and 60/449,982, both filed Feb. 26, 2003

TECHNICAL FIELD

This invention relates to mounting devices and more particularly to self-locating mounting devices. Still more particularly, it relates to a self-locating light-shield for an automotive headlight.

BACKGROUND ART

Automotive headlights can employ a halogen bulb mounted in a reflector. The forward-facing portion of the bulb is shielded. The shield has been affixed to a push-in mount that does not adequately position the shield and occasionally falls out. Proposed solutions using a screw-in mount are workable but expensive and require extra parts and handling.

DISCLOSURE OF INVENTION

It is, therefore, an object of the invention to obviate the disadvantages of the prior art.

It is another object of the invention to enhance mounting systems.

Yet another object of the invention is the enhancement of automotive headlight assemblies.

Still another object of the invention is the enhancement of push-in shield mounting systems that are self-positioning and easily maintained in an appropriate location and that are easily removable in the event parts are scrapped, allowing the light shields to be salvaged.

These objects are accomplished, in one aspect of the invention, by the provision of a self-locating mounting system comprising a housing containing a mounting receptacle with three closed sides and an open side, a substantially solid bottom containing a laterally extending slot and a top containing an opening; a first sub-assembly having only a planar surface with an aperture therein, a solid rear wall and a depending side wall, said depending side wall being formed to engage said laterally extending slot in said housing and protrude therefrom; a second sub-assembly comprising a body with an upper surface and four walls including a front, back and two sides; a compressible lock associated with said upper surface; a first spring associated with one of said sides; and a second spring associated with said back; said first sub-assembly being positioned atop said second assembly with said compressible lock penetrating said aperture in said planar surface, said first spring engaging said depending side wall and said second spring engaging said solid rear wall, said first and second sub-assemblies being positioned in said receptacle with said compressible lock engaging a wall of said opening in said top of said housing and said depending side wall protruding from said laterally extending slot.

An appropriate shield can be affixed to the depending sidewall.

This self-locating mounting system applies tension in X, Y and Z directions to orient the depending sidewall and the collapsible lock removably fixes the entire assembly in place.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
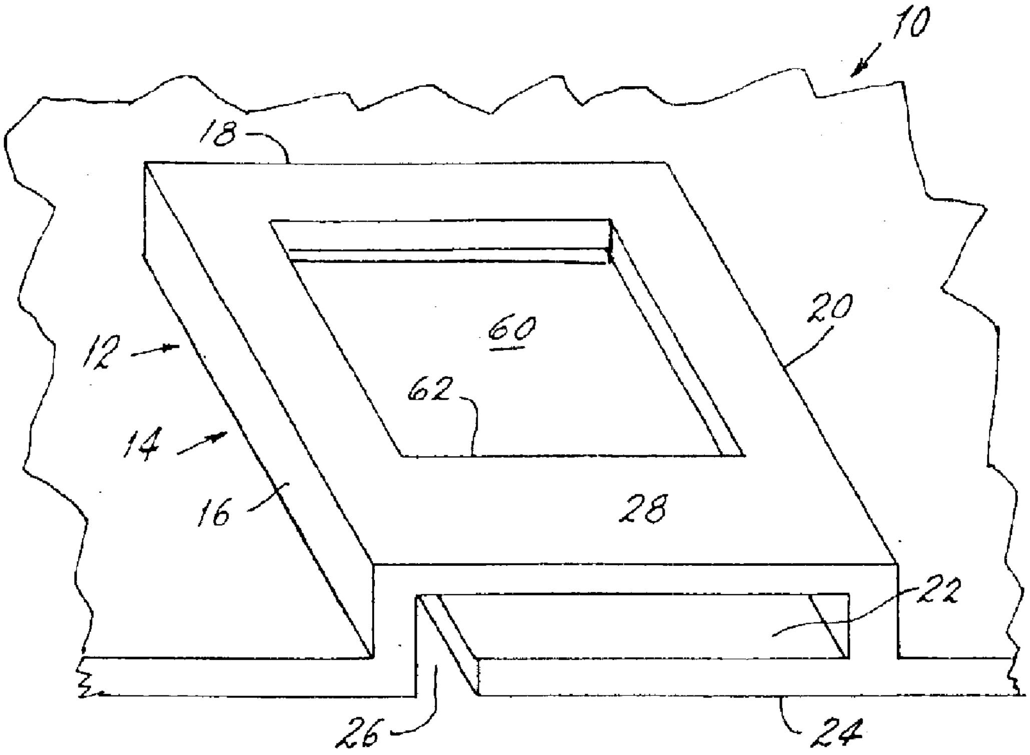
FIG. 1 is a perspective view of a housing utilized with the invention.

Referring now to the drawings with greater particularity, there is shown in FIG. 1 a self-centering mounting system 10 having a housing 12 containing a mounting receptacle 14. The mounting system can be part of an automotive headlight reflector. The mounting receptacle 14 has three closed sides, 16, 18, 20, an open side 22, a substantially solid bottom 24 provided with a laterally extending slot 26 and a top 28 containing an opening 60.

Figure 2:
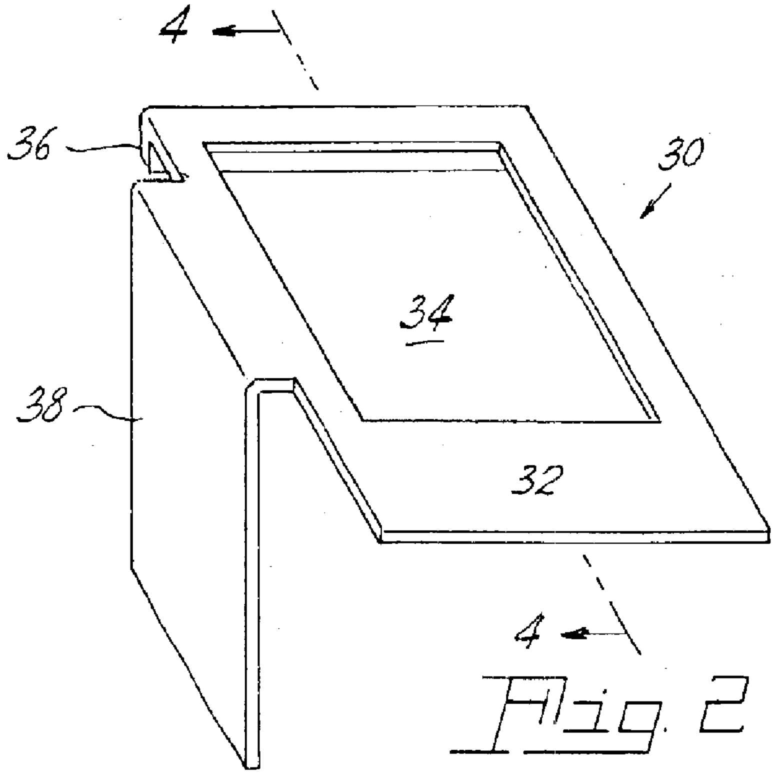
FIG. 2 is a perspective view of a first sub-assembly.

A first sub-assembly 30 is shown in FIG. 2 and has only a planar surface 32 with an aperture 32 therein, a solid rear wall 36 and a depending side wall 38. When assembled, the depending sidewall 38 will fit into slot 26 and protrude therefrom.

Figure 3:
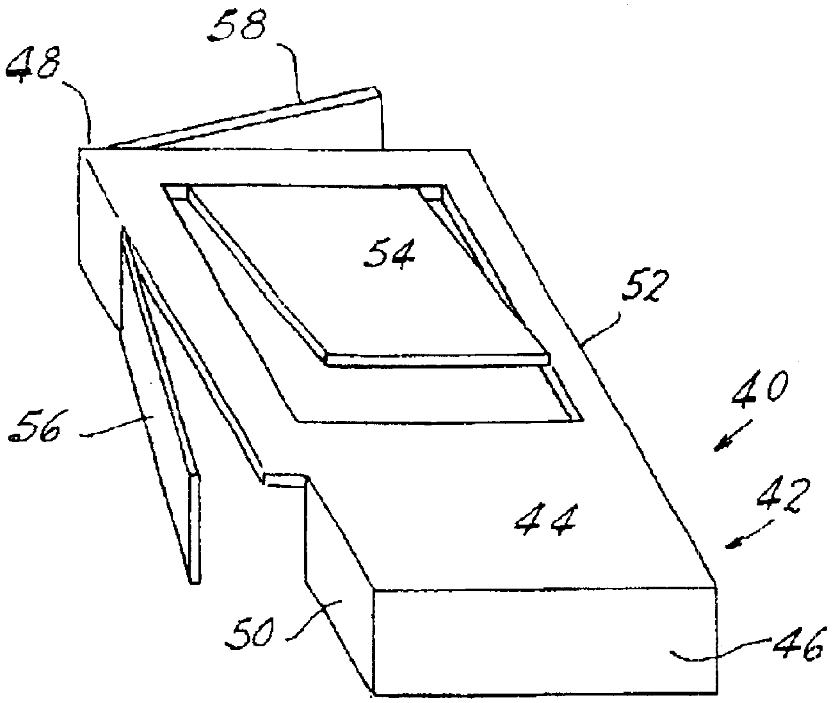
FIG. 3 is a perspective view of a second sub-assembly.

A second sub-assembly 40 (FIG. 3) comprises a body 42 having an upper surface 44 and four walls including a front wall 46, a back wall 48 and two sides 50 and 52. A compressible lock 54 in the form of a planar spring is associated with the upper surface 44 and a first spring 56 is associated with side 50 and a second spring 58 is associated with the back 48. In a preferred embodiment of the invention the second sub-assembly is hollow and the springs and the compressible lock are formed from the material of the upper surface and the respective sides. This provides a structure that is light in weight and easy to manipulate. However, if desired, separate springs can be appropriately affixed to their respective surfaces in any convenient manner.

Figure 5:
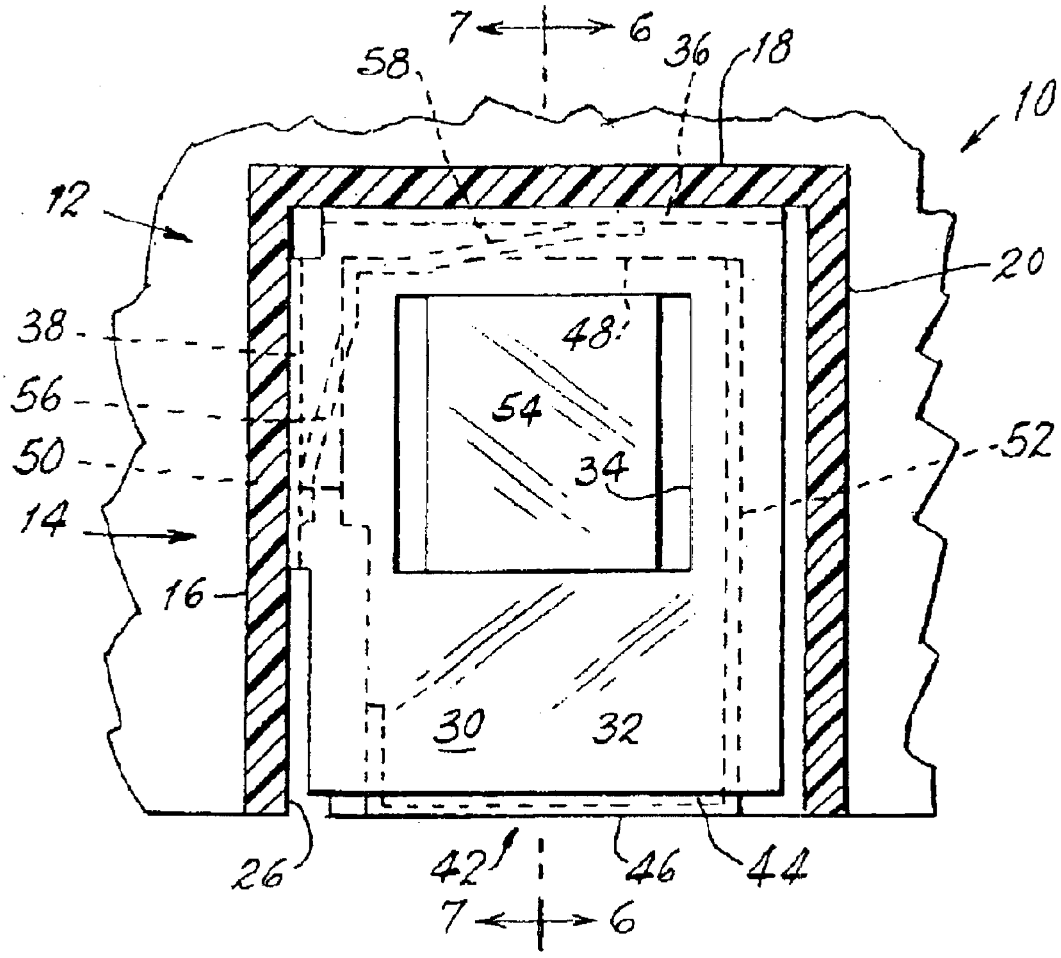
FIG. 5 is a plan view of an assembled mounting system, partially in section.
Figure 6:
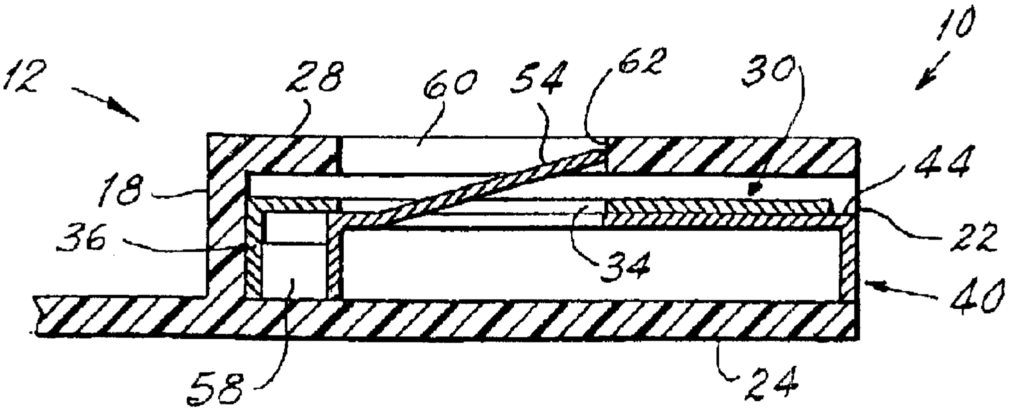
FIGS. 6 and 7 are elevational sectional views taken along the lines 6—6 and 7—7 of FIG. 5.
Figure 7:
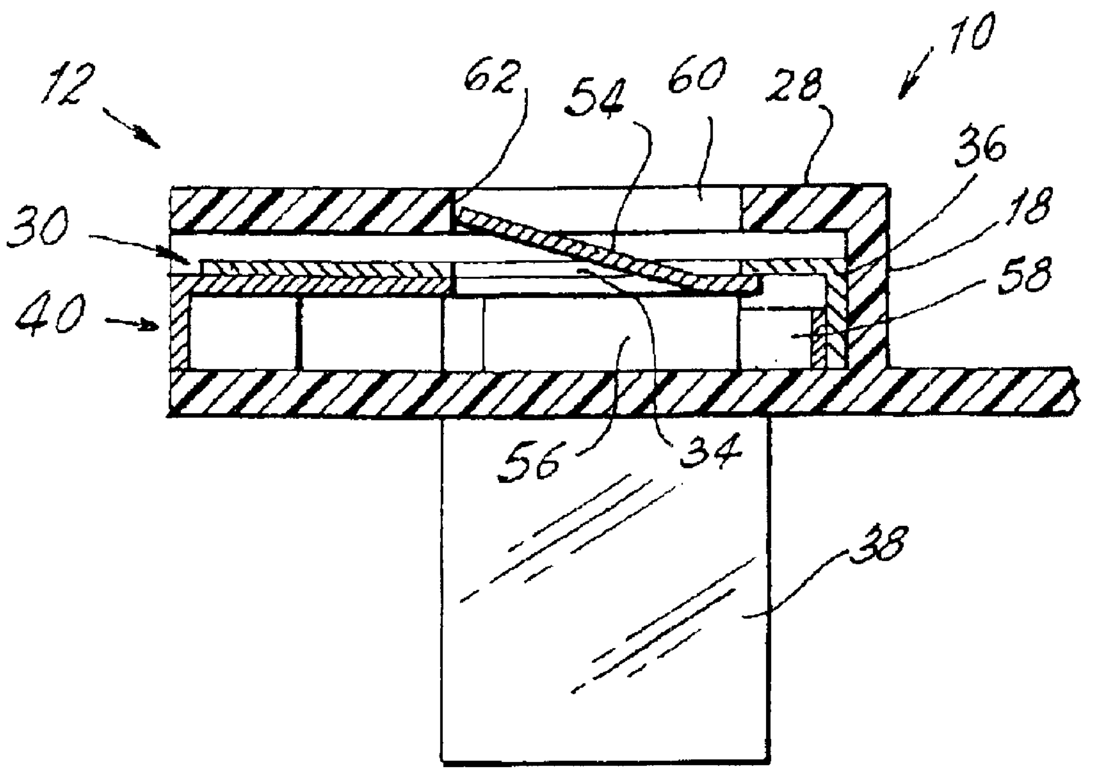

To utilize the various units, the first sub-assembly 30 is positioned atop the second sub-assembly 40 with the compressible lock penetrating the aperture 34 in the planar surface 32, the first spring 56 engaging the interior side of the depending side wall 38 and the second spring 58 engaging the interior surface of the back wall 48. Maintaining the units in this position the entire assembly is pushed into the mounting receptacle with the depending wall 38 slipping into slot 26. Insertion is completed when the compressible lock 54 penetrates the opening 60. At this point pressure from second spring 58 presses the back 36 of the first sub-assembly against wall 18 and simultaneously presses the assembly forward toward the open side 22. Egress of the assembly is prevented by the compressible lock 54 engaging a wall 62 of opening 60. Sideways positioning as accomplished by the action of spring 56 exerting pressure on the depending wall 38. This positioning is best seen in FIG. 5, while the action of the spring 58 and compressible lock 54 can be seen in FIGS. 6 and 7.

Figure 4:
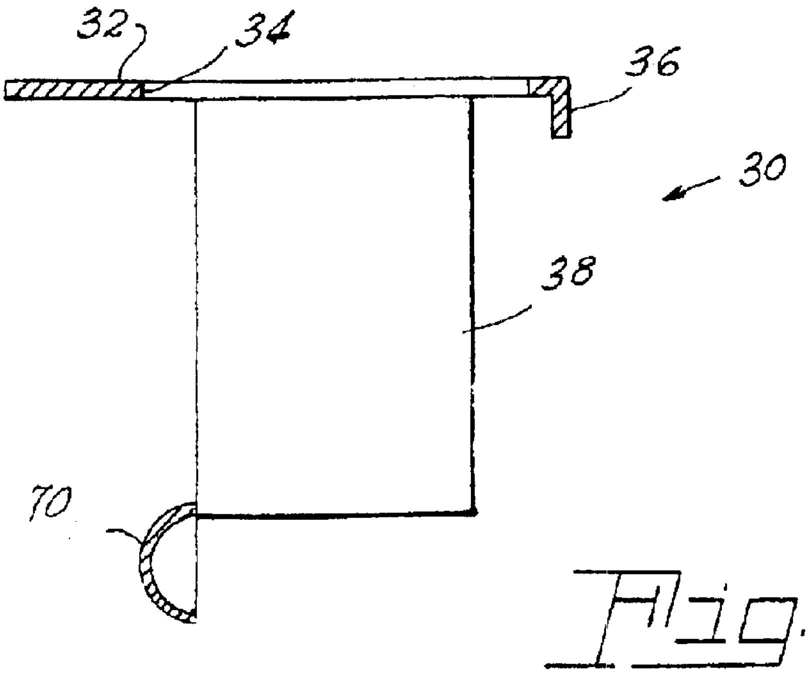
FIG. 4 is an elevational sectional view taken along the line 4—4 of FIG. 2.

The action of the springs 56 and 58 and the cooperation of the compressible lock 54 completely position the assembly and maintain it in the desired location; however, when desired the entire assembly can be easily removed by depressing the compressible lock 54 and drawing the assembly in the direction opposite the insertion direction. When this assembly is a part of an automotive headlight assembly, the depending wall 38 is provided with a light shield 70 in the form of a hollow hemisphere, as is shown in FIG. 4. The light shield will engage and cover the forward most area of the headlight light source. Covering the front area of the light source eliminates a perception of a point source of light that can be distracting to oncoming drivers.

Preferably the sub-assemblies 30 and 40 are constructed of a suitable material. For example, in sub-assembly 30 the depending sidewall 38 can be formed of 1018 CRS and the cup 70 can be formed from 1010 or 1008 CRS and can be 0.50 mm thick. Sub-assembly 40 is preferably formed from 1050 spring steel such as $R^{C}$ 42–50 or SAE 1074 high carbon spring steel or HD galvanized. Material on the order of 0.8 mm thickness is preferred.

Thus there is provided a self-centering mounting system that is convenient, solid and easy to install and yet remains easily removable in the event a shield must be salvaged.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A self-locating mounting system comprising:

a housing containing a mounting receptacle with three closed sides and an open side, a substantially solid bottom containing a laterally extending slot and a top containing an opening;

a first sub-assembly having only a planar surface with an aperture therein, a rear wall and a depending side wall, said first subassembly formed to be slideably insertable through said open side of said receptacle with said rear wall engaging with a second of said three closed sides, and said depending side wall being formed to engage said laterally extending slot in said housing and protrude therefrom; and a second sub-assembly comprising a body with an upper surface and four walls including a front, back and two sides;

the second sub-assembly having a compressible lock associated with said upper surface;

a first spring associated with one of said sides; and a second spring associated with said back;

said second sub-assembly formed to be slideably insertable through said open side of said receptacle intermediate the housing and the first-subassembly with the first-subassembly inserted in the receptacle;

said first sub-assembly being positioned atop said second sub-assembly with said compressible lock penetrating said aperture in said planar surface, said first spring engaging said depending side wall and said second spring engaging said rear wall abutting the first sub-assembly to the receptacle, said first and second sub-assemblies being positioned in said receptacle with said compressible lock engaging a wall of said opening in said top of said housing and said depending side wall protruding from said laterally extending slot.

2. The self-locating mounting system of claim 1 wherein said second sub-assembly body is bottomless and hollow.

3. The self-locating mounting system of claim 1 wherein said compressible lock, said first spring and said second spring are formed from their associated surface and sides.

4. The self-locating mounting system of claim 1 wherein said housing comprises a part of a reflector for an automotive headlight.

5. A self-locating mounting system comprising:

a housing containing a mounting receptacle with three closed sides and an open side, a substantially solid bottom containing a laterally extending slot and a top containing an opening;

a first sub-assembly having only a planar surface with an aperture therein, a rear wall and a depending side wall said first subassembly formed to be slideably insertable through said open side of said receptacle with said rear wall engaging with a second of said three closed sides, and said depending side wall being formed to engage said laterally extending slot in said housing and protrude therefrom; and a second sub-assembly comprising a body with an upper surface and four walls including a front, back and two sides;

the second sub-assembly having a compressible lock associated with said upper surface;

a first spring associated with one of said sides; and a second spring associated with said back;

said second sub-assembly formed to be slideably insertable through said open side of said receptacle intermediate the housing and the first-subassembly with the first-subassembly inserted in the receptacle;

said first sub-assembly being positioned atop said second sub-assembly with said compressible lock penetrating said aperture in said planar surface, said first spring engaging said depending side wall and said second spring engaging said rear wall abutting the first sub-assembly to the receptacle, said first and second sub-assemblies being positioned in said receptacle with said compressible lock engaging a wall of said opening in said top of said housing and said depending side wall protruding from said laterally extending slot; and wherein said depending sidewall is provided with a light shield.

* * * * *